(12) United States Patent
Jacob et al.

(10) Patent No.: US 11,745,879 B2
(45) Date of Patent: Sep. 5, 2023

(54) THIN FILM HEATER CONFIGURATION FOR AIR DATA PROBE

(71) Applicant: Rosemount Aerospace Inc.

(72) Inventors: Robin Jacob, Bangalore (IN); Guru Prasad Mahapatra, Karnataka (IN)

(73) Assignee: Rosemount Aerospace Inc., Burnsville, MN (US)

( * ) Notice: Subject to any disclaimer, the term of this patent is extended or adjusted under 35 U.S.C. 154(b) by 283 days.

(21) Appl. No.: 16/903,686

(22) Filed: Jun. 17, 2020

(65) Prior Publication Data

US 2021/0291992 A1    Sep. 23, 2021

(30) Foreign Application Priority Data

Mar. 20, 2020   (IN) .............................. 202041012145

(51) Int. Cl.
*B64D 15/12*   (2006.01)
*H05B 3/14*    (2006.01)

(52) U.S. Cl.
CPC ............. *B64D 15/12* (2013.01); *H05B 3/145* (2013.01); *H05B 2203/013* (2013.01); *H05B 2203/017* (2013.01); *H05B 2203/02* (2013.01); *H05B 2214/02* (2013.01); *H05B 2214/03* (2013.01)

(58) Field of Classification Search
CPC .. B64D 15/12; H05B 3/145; H05B 2203/013; H05B 2203/017; H05B 2203/02; H05B 2214/02; H05B 1/0236; H05B 2214/04; H05B 3/26; G01P 5/165
See application file for complete search history.

(56) References Cited

U.S. PATENT DOCUMENTS

| | | | |
|---|---|---|---|
| 2,254,155 A | 8/1941 | Reichel | |
| 4,121,088 A | 10/1978 | Doremus et al. | |
| 4,458,137 A * | 7/1984 | Kirkpatrick | G01P 5/165 |
| | | | 73/182 |
| 4,801,784 A | 1/1989 | Jensen et al. | |
| 5,421,202 A | 6/1995 | Le Pimpec | |
| 5,764,470 A * | 6/1998 | Mihara | H02H 9/026 |
| | | | 361/111 |
| 6,070,475 A | 6/2000 | Muehlhauser et al. | |

(Continued)

FOREIGN PATENT DOCUMENTS

| | | |
|---|---|---|
| CN | 109683642 A | 4/2019 |
| DE | 102009034306 A1 | 3/2011 |

(Continued)

OTHER PUBLICATIONS

Extended European Search Report dated Aug. 25, 2021, received for corresponding European Application No. 21163469.6, ten pages.

(Continued)

*Primary Examiner* — Jimmy Chou
*Assistant Examiner* — Yi Hao
(74) *Attorney, Agent, or Firm* — Kinney & Lange, P.A.

(57) ABSTRACT

A hybrid heater system for an aircraft air data sensor includes a voltage source and a first hybrid heater set. The first hybrid heater set includes a carbon nanotube (CNT) heater, a first positive temperature coefficient (PTC) heater disposed in parallel with the CNT heater to form a parallel formation, and a second PTC heater disposed in series between the voltage source and the parallel formation.

18 Claims, 4 Drawing Sheets

(56) References Cited

U.S. PATENT DOCUMENTS

| | | | |
|---|---|---|---|
| 6,134,972 A | 10/2000 | Streckert et al. | |
| 6,492,629 B1 | 12/2002 | Sopory | |
| 6,591,696 B2 | 7/2003 | Bachinski | |
| 8,164,035 B2 | 4/2012 | Chang | |
| 8,197,621 B2 | 6/2012 | Jung | |
| 8,367,986 B2 | 2/2013 | Von Wachenfeldt et al. | |
| 8,466,392 B2 | 6/2013 | O'Connor | |
| 8,481,898 B2 | 7/2013 | Parker | |
| 8,496,854 B2 | 7/2013 | Mercx et al. | |
| 8,525,084 B2 | 9/2013 | O'Connor | |
| 8,581,158 B2 | 11/2013 | Heintz et al. | |
| 8,664,573 B2 | 3/2014 | Shah et al. | |
| 8,752,279 B2 | 6/2014 | Brittingham et al. | |
| 8,952,300 B2 | 2/2015 | Malone et al. | |
| 9,091,657 B2 | 7/2015 | Kessler et al. | |
| 9,237,606 B2 | 1/2016 | Yue et al. | |
| 9,511,871 B2 * | 12/2016 | Steinwandel | H05B 3/18 |
| 9,668,301 B2 | 5/2017 | Lim et al. | |
| 9,693,394 B2 | 6/2017 | Sweeney et al. | |
| 9,719,820 B1 | 8/2017 | Jacob et al. | |
| 9,955,531 B2 | 4/2018 | Kang et al. | |
| 10,132,824 B2 | 11/2018 | Benning et al. | |
| 10,197,588 B2 | 2/2019 | Wong et al. | |
| 10,368,394 B2 | 7/2019 | Shearer et al. | |
| 11,235,881 B2 * | 2/2022 | Jacob | H05B 3/145 |
| 11,425,797 B2 | 8/2022 | Jacob et al. | |
| 11,585,826 B2 | 2/2023 | Jacob et al. | |
| 2008/0179448 A1 | 7/2008 | Layland et al. | |
| 2009/0194525 A1 | 8/2009 | Lee et al. | |
| 2009/0314765 A1 | 12/2009 | Feng et al. | |
| 2010/0059502 A1 | 3/2010 | O'Connor | |
| 2010/0096507 A1 | 4/2010 | Villinger | |
| 2010/0102052 A1 | 4/2010 | Boardman | |
| 2010/0116806 A1 | 5/2010 | Hollingsworth et al. | |
| 2011/0297665 A1 * | 12/2011 | Parker | H05B 3/22 219/494 |
| 2014/0034633 A1 | 2/2014 | Heintz et al. | |
| 2014/0070054 A1 | 3/2014 | Burton et al. | |
| 2014/0071216 A1 | 3/2014 | Hu et al. | |
| 2015/0344137 A1 | 12/2015 | Bartz et al. | |
| 2016/0007474 A1 | 1/2016 | Dardona et al. | |
| 2016/0113063 A1 | 4/2016 | O'Connor et al. | |
| 2016/0221680 A1 | 8/2016 | Burton et al. | |
| 2017/0158898 A1 | 6/2017 | Xiao et al. | |
| 2017/0370960 A1 | 12/2017 | Benning et al. | |
| 2018/0112938 A1 | 4/2018 | Mahapatra et al. | |
| 2018/0124874 A1 | 5/2018 | Dardona et al. | |
| 2018/0160482 A1 | 6/2018 | Hartzler et al. | |
| 2019/0383848 A1 | 12/2019 | Matheis et al. | |
| 2020/0086999 A1 | 3/2020 | Jacob et al. | |
| 2020/0189751 A1 | 6/2020 | Jacob et al. | |
| 2021/0127458 A1 | 4/2021 | Jacob et al. | |
| 2021/0291992 A1 | 9/2021 | Jacob et al. | |

FOREIGN PATENT DOCUMENTS

| | | |
|---|---|---|
| EP | 3182794 A1 | 6/2017 |
| EP | 3264103 A1 | 1/2018 |
| EP | 3321692 A1 | 5/2018 |
| EP | 3668270 A1 | 6/2020 |
| KR | 101184780 B1 | 9/2012 |
| WO | 2016144683 A1 | 9/2016 |

OTHER PUBLICATIONS

Examination Report for European Patent Application No. 21163469. 6, dated Sep. 14, 2022, 4 pages.

Chu et al. "Electrical and Thermal Properties of Carbon-Nanotube Composite for Flexible Electric Heating-Unit Applications" IEEE Electron Device Letters vol. 34 No. 5 (May 2013) pp. 668-670.

* cited by examiner

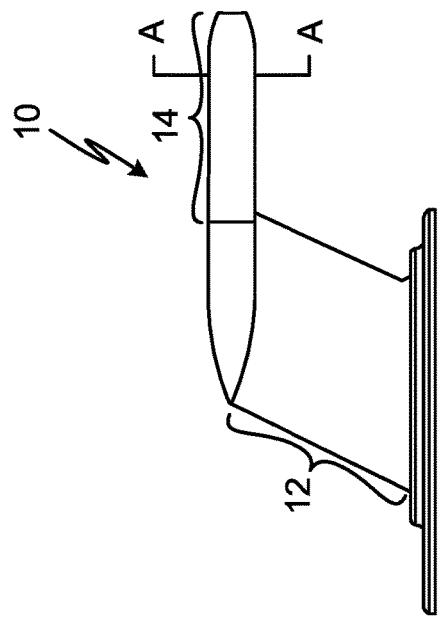
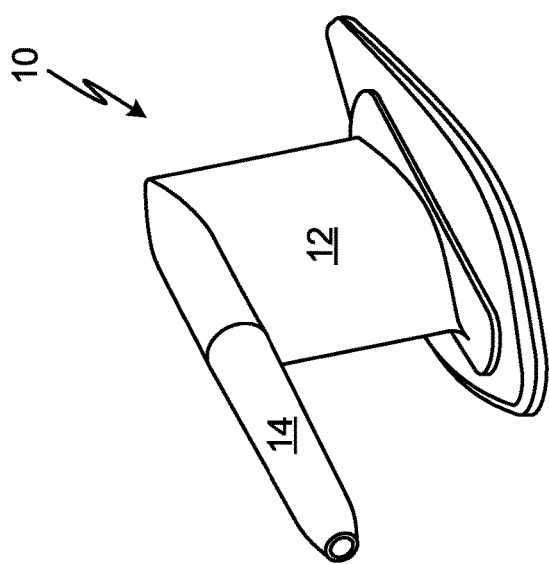
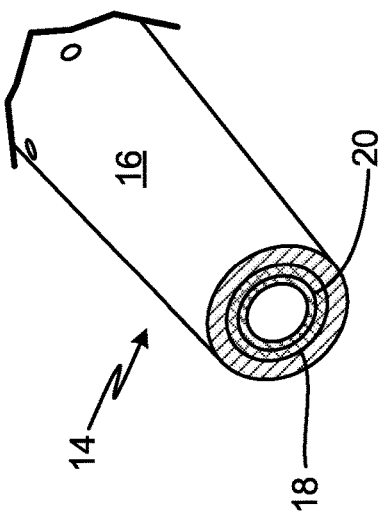
Fig. 1B
Fig. 1A
Fig. 1C

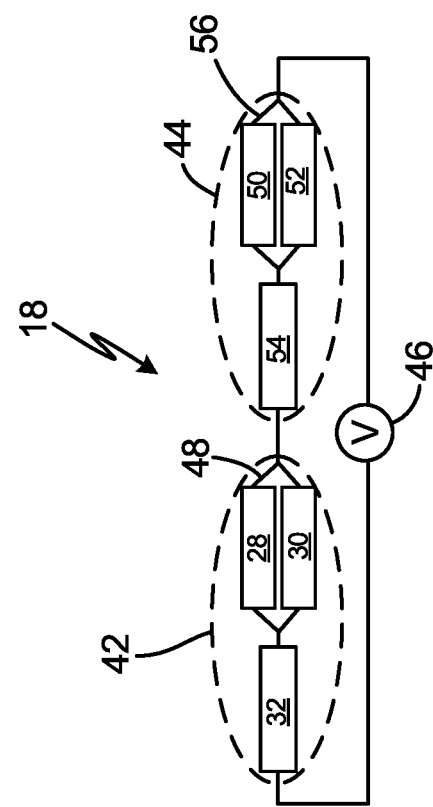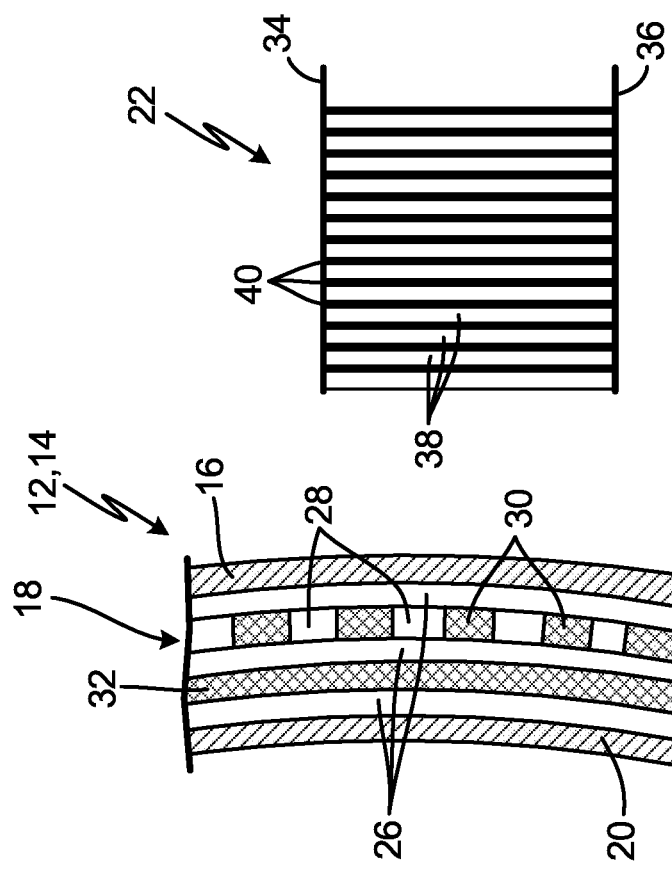

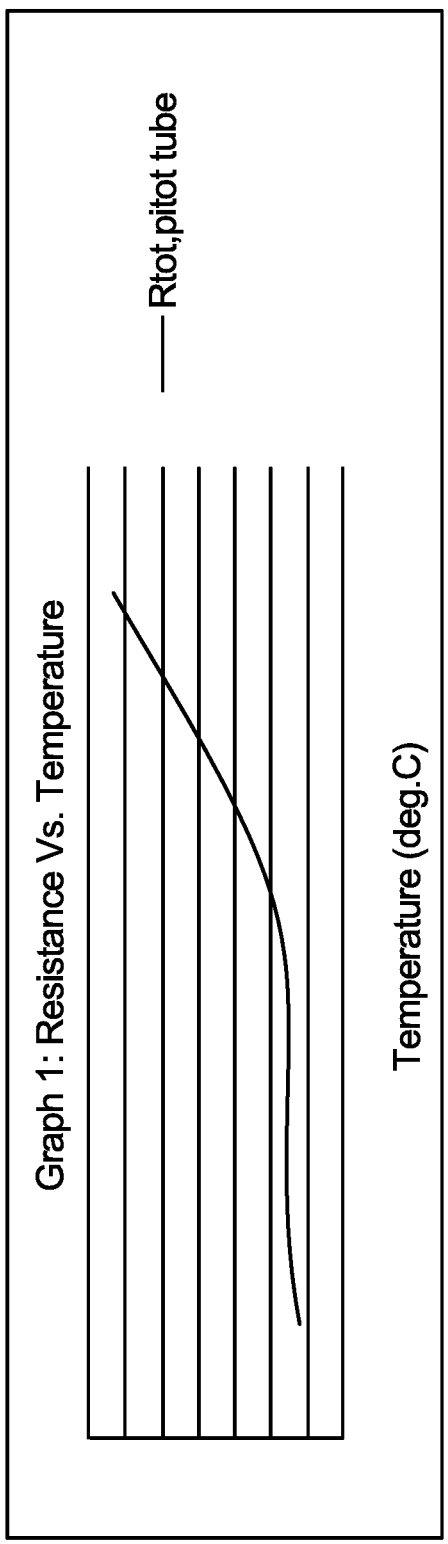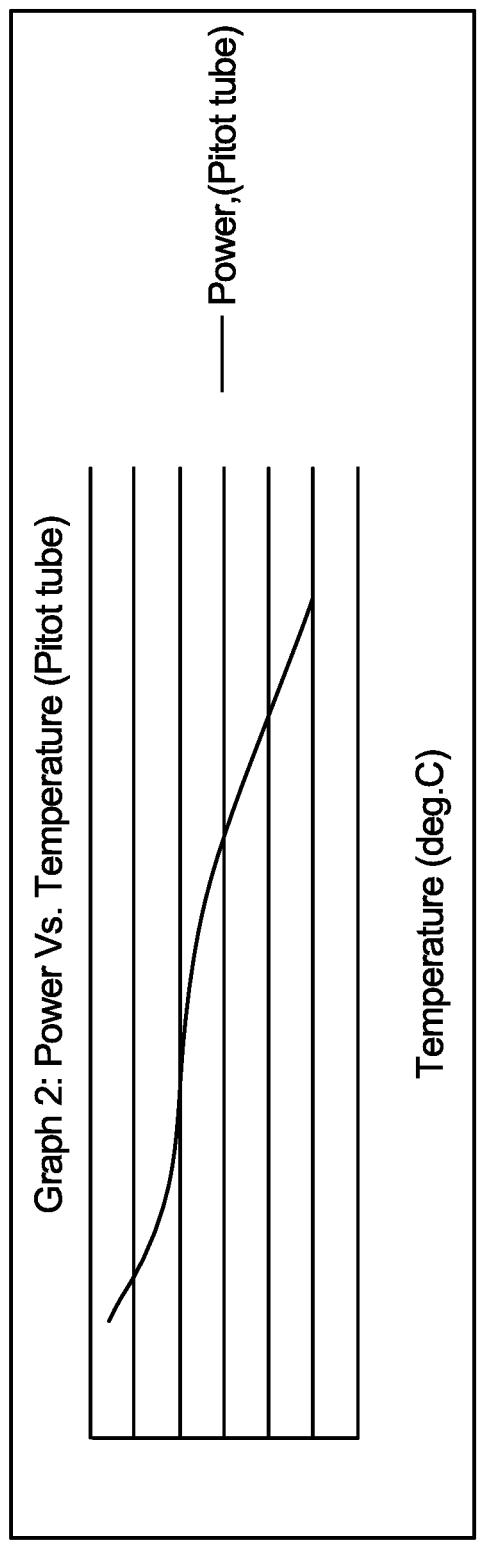

THIN FILM HEATER CONFIGURATION FOR AIR DATA PROBE

CROSS-REFERENCE TO RELATED APPLICATION(S)

This application claims priority to the application serial no. 202041012145 filed on Mar. 20, 2020 in Indian Patent Office.

BACKGROUND

The following description relates to air data sensors, and more specifically, to heater systems for aircraft air data sensors.

Ice accretion on aircraft air data sensors can render the air data sensors inoperable for their intended purpose. Heaters are implemented to prevent ice accretion or melt ice that has already accreted on air data sensors. Typically, nichrome-based metal alloy resistance heaters are used to heat air data sensors. However, nichrome-based metal alloy resistance heaters result in high power consumption without high heating capacity.

SUMMARY

In one embodiment, a hybrid heater system for an aircraft air data sensor includes a voltage source and a first hybrid heater set. The first hybrid heater set includes a carbon nanotube (CNT) heater, a first positive temperature coefficient (PTC) heater disposed in parallel with the CNT heater to form a parallel formation, and a second PTC heater disposed in series between the voltage source and the parallel formation.

In another embodiment, a hybrid heater system for ice protection of an air data probe on an aircraft includes a voltage source, a carbon nanotube (CNT) heater, which includes CNT heater elements, a first positive temperature coefficient (PTC) heater disposed in parallel with the CNT heater to form a parallel formation, and a second PTC heater. The first PTC heater includes first PTC heater elements interleaved with the CNT heater elements in a first air data probe layer. The second PTC heater is disposed in a second air data probe layer and in series between the voltage source and the parallel formation.

In another embodiment, a method of making a heater for an air data probe includes positioning on the air data probe a first heater layer. The first heater layer includes a carbon nanotube (CNT) heater element and a first positive temperature coefficient (PTC) heater element interleaved with one another. The method of heating an air data probe further includes positioning on the air data probe a second heater layer. The second heater layer includes a second PTC heater element. The method of heating an air data probe further includes wiring the first heater layer and the second heater layer so that the CNT heater element and the first PTC heater element are in parallel with one another defining a parallel formation. The method of heating an air data probe further includes wiring the second heater layer so that the second PTC heater element is in series with the first parallel formation and a voltage source.

BRIEF DESCRIPTION OF THE DRAWINGS

FIG. 1A is a perspective view of an air data sensor.
FIG. 1B is a side view of an air data sensor.
FIG. 1C is a zoomed-in cross-sectional view taken along line A-A in FIG. 1B of an air data sensor.
FIG. 2A is a schematic illustration showing one configuration of the hybrid heater system.
FIG. 2B is a schematic illustration showing hybrid heater elements.
FIG. 2C is a schematic illustration showing the configuration of a hybrid heater system in the strut assembly and a hybrid heater system in the housing assembly in series with one another and a voltage source.
FIG. 4A is a graph showing resistance as a function of temperature for a hybrid heater system.
FIG. 4B is a graph showing power as a function of temperature for a hybrid heater system.

Figure 3:
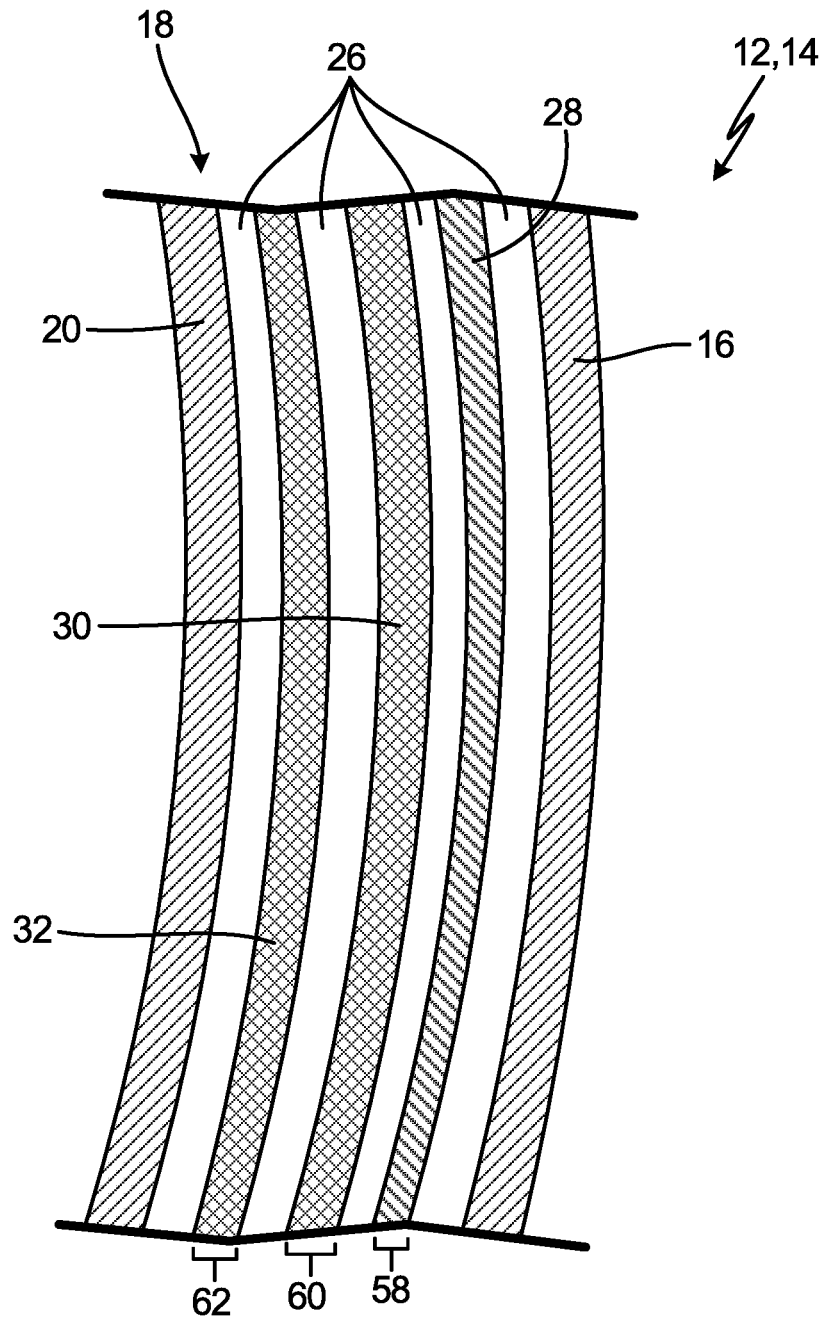
FIG. 3 is a schematic view showing another configuration of the hybrid heater system.

While the above-identified drawing figures set forth one or more embodiments, other embodiments are contemplated. It should be understood that numerous other modifications and embodiments can be devised by those skilled in the art, which fall within the scope and spirit of the principles of the claims. The figures may not be drawn to scale, and applications and embodiments may include features and components not specifically shown in the drawings. Like reference numerals identify similar structural elements.

DETAILED DESCRIPTION

The present disclosure relates to air data probes with hybrid heater systems using carbon nanotube (CNT) heaters and positive temperature coefficient (PTC) heaters. CNT heaters are made with carbon nanotube and a silicone composite. CNT heaters have a negative temperature coefficient (NTC) at low temperatures. Because CNT heaters have an NTC at low temperatures, the electrical resistance of CNT heaters is higher at low temperatures and drops drastically and stabilizes at a lower resistance level at higher temperatures. The NTC of CNT heaters makes CNT heaters great for quickly heating a device or mechanism. However, because CNT heaters have an NTC, there is no regulating mechanism at higher temperatures unless they are installed with temperature sensor feedback systems. PTC heaters increase in electrical resistance as temperature increases. As a result of the increased resistance with the increased temperature, PTC heaters self-regulate the temperatures at a pre-defined higher temperature. The hybrid heater system is a self-regulating heater system using CNT and PTC heaters. The hybrid heater system for air data probes will be described below with reference to FIGS. 1A-4B.

FIGS. 1A-1C will be discussed concurrently. FIG. 1A is a perspective view of air data sensor 10. FIG. 1B is a side view of air data sensor 10. FIG. 1C is a zoomed-in cross-sectional view taken along line A-A in FIG. 1B of air data sensor 10. Air data sensor 10 includes strut assembly 12 and housing assembly 14. Housing assembly 14 includes probe surface 16, hybrid thin-film heater system 18 ("heater system 18"), and probe sleeve 20. In the present embodiment, air data sensor 10 is a pitot-tube air data sensor. In another embodiment, air data sensor 10 can be a pitot-static probe, multi-function probe with flow angle measurement, and/or any other air data sensor used on an aircraft.

Strut assembly 12 attaches to an airplane (not shown) and extends radially outward from the airplane. Housing assembly 14 is tubular in shape and extends from strut assembly 12. Housing assembly 14 is generally parallel to the surface of the airplane. Sleeve 20 is within housing assembly 14 and guides airflow into air data sensor 10.

To prevent ice accretion and melt ice accretion within and on the exterior surface of air data sensor 10, heater system 18 can be installed within strut assembly 12 and housing assembly 14. As shown in FIG. 1C, heater system 18 is installed within housing assembly 14 between probe surface 16 and probe sleeve 20. Probe surface 16 is the exterior shell of air data sensor 10 and helps protect air data sensor 10 and heater system 18. Air flows into air data sensor 10 through probe sleeve 20. Probe sleeve 20 helps protect air data sensor 10 and heater system 18. Heater system 18 can effectively heat probe surface 16 and probe sleeve 20 to prevent ice accretion thereon. In the present embodiment, heater system 18 is installed within air data sensor 10. In another embodiment, heater system 18 can be installed on the exterior of air data sensor 10.

FIG. 2A is a schematic illustration showing one configuration of heater system 18. In the embodiment of FIG. 2A, there are two heater layers, first heater layer 22 and second heater layer 24. In between heater layer 22 and heater layer 24, is film adhesive and insulation 26. Film adhesive and insulation 26 is also used in between probe surface 16 and first heater layer 22 and between probe sleeve 20 and second heater layer 24. Film adhesive and insulation 26 help hold each heater layer (layers 22 and 24) in place within air data sensor 10. Film adhesive and insulation 26 further help insulate air data sensor 10. First heater layer 22 includes CNT heater 28 and first PTC heater 30. Second heater layer 24 includes second PTC heater 32. Because CNT heater 28 is made from carbon nanotube and silicone composite, CNT heater 28 is more rigid and durable than PTC heater 30 and PTC heater 32. Therefore, CNT heater 28 is in first heater layer 22 to protect first PTC heater 30 and second PTC heater 32.

FIG. 2B is a schematic illustration showing first heater layer 22. First heater layer 22 includes positive terminal 34, negative terminal 36, PTC heater elements 38, and CNT heater elements 40. In first heater layer 22, PTC heater elements 38 and CNT heater elements 40 extend from positive terminal 34 to negative terminal 36 and are interleaved with one another. As a result, PTC heater elements 38 and CNT heater elements 40 are connected physically and electrically in parallel to one another.

FIG. 2C is a schematic diagram showing the configuration of heater system 18. Heater system 18 includes first heater set 42, second heater set 44, and voltage source 46. First heater set 42 includes CNT heater 28, first PTC heater 30, and second PTC heater 32.

First CNT heater 28 and first PTC heater 30 are wired in parallel, forming first parallel formation 48. Second PTC heater 32 is wired in series between voltage source 46 and first parallel formation 48. First heater set 44 is installed within strut assembly 12 of air data sensor 10.

The resistance of parallel formation 48 in first heater set 42 is less than each of the individual resistance of CNT heater 28 and first PTC heater 30. Therefore, parallel formation 48 ensures faster heating than CNT heater 28 would provide by itself. The resistance of second PTC heater 32 is selected so that the total resistance of second PTC heater 32 and parallel formation 48 is less than the resistance of CNT heater 28 at a set lower temperature (e.g., less than 20° C.). The resistance of second PTC heater 32 and parallel formation 48 is less than the resistance of CNT heater 28 at lower temperatures so that PTC heaters (30 and 34) do not impede CNT heater 28 at low temperatures. The resistance of second PTC heater 32 is further configured so that the resistance of second PTC heater 32 will increase to a maximum resistance at a set higher temperature, therefore the electrical resistivity of first PTC heater 30 and second PTC heater 32 do not need to be equal. The initial lower resistance of first heater set 42 when first heater set 42 is at a low temperature results in first heater set 42 rapidly heating strut assembly 12. At a higher temperature, the resistance of second PTC heater 32 increases to a maximum. When the resistance of second PTC heater 32 reaches a maximum, second PTC heater 32 restricts the power input to first parallel formation 48. As a result of the power input being restricted to first parallel formation 48, first heater set 42 will not overheat and first heater set 42 will reduce the power consumption of heater system 18. First PTC heater 30 and second PTC 32 provide self-regulation of first heater set 42 and help mitigate either hot or cold spots on strut assembly 12.

Second heater set 44 includes second CNT heater 50, third PTC heater 52, and fourth PTC heater 54. Third PTC heater 52 and second CNT heater 50 are wired in parallel, forming second parallel formation 56. Fourth PTC heater 54 is wired in series with voltage source 46 and second parallel formation 56. Second heater set 44 is within housing assembly 14 of air data sensor 10.

In the present embodiment, the values of electrical resistance for second heater set 44 can be similar to the values discussed in relation to first heater set 42 above. In other embodiments, the values for the electrical resistance of second heater set 44 can be different than the values discussed in relation to first heater set. However, with different resistance values, the relationship of those values will be essentially the same as the relationship of the values in Table 1. For example, the resistance of parallel formation 56 in second heater set 44 is less than each of the individual resistance of second CNT heater 50 and third PTC heater 52. Therefore, second parallel formation 56 ensures faster heating than second CNT heater 50 would provide by itself. The resistance of fourth PTC heater 54 is selected so that the total resistance of fourth PTC heater 54 and second parallel formation 56 is less than the resistance of second CNT heater 50 at a lower temperature (e.g., less than 20° C.). The resistance of fourth PTC heater 54 and second parallel formation 56 is less than the resistance of second CNT heater 50 at lower temperatures so that PTC heaters (52 and 54) do not impede second CNT heater 50 at low temperatures. The resistance of fourth PTC heater 54 is further configured so that the resistance of fourth PTC heater 54 will increase to a maximum resistance at a set higher temperature. The initial lower resistance of second heater set 44 when second heater set 44 is at a low temperature results in second heater set 44 rapidly heating housing assembly 14. At a higher temperature, the resistance of fourth PTC heater 54 increases to a maximum. When the resistance of fourth PTC heater 54 reaches a maximum, fourth PTC heater 54 restricts the power input to second parallel formation 56. As a result of the power input being restricted to second parallel formation 56, second heater set 44 will not overheat and second heater set 44 will reduce the power consumption of heating system 18. Third PTC heater 52 and fourth PTC 54 provide self-regulation of second heater set 44 and help mitigate either hot or cold spots on housing assembly 14.

In the present embodiment, first heater set 42 and second heater set 44 are configured to have different resistances to ensure they adequately heat strut assembly 12 and housing assembly 14, respectively. In another embodiment, first heater set 42 and second heater set 44 can be identical and provide equal heating to strut assembly 12 and housing assembly 14, respectively.

In the present embodiment, first heater set 42 can be located within strut assembly 12 and second heater set 44 can be located within housing assembly 14. When first heater set 42 is located within strut assembly 12 and second heater set 44 is located within housing assembly 14, first heater set 42 and second heater set 44 can be wired in series with one another and voltage source 46. In another embodiment, first heater set 42 is located within strut assembly 12 and second heater set 44 is located within housing assembly 14, first heater set 42 and second heater set 44 each heating system can have dedicated voltage sources, and each system (first heater set 42 and second heater set 44) can be a standalone system independent of one another.

FIG. 3 is a schematic diagram of an alternative configuration of the heater system 18. In the embodiment of FIG. 3, heater system 18 includes third heater layer 58, fourth heater layer 60, and fifth heater layer 62. Film adhesive and insulation 26 is found between each of the heater layers (58, 60, and 62), between probe surface 16 and third heater layer 58, and between probe sleeve 20 and fifth heater layer 62. Third heater layer 58 includes CNT heater 28. Fourth heater layer 60 includes PTC heater 30. Fifth heater layer 62 includes PTC heater 32. Third heater layer 58 and fourth heater layer 60 are wired in parallel to form parallel formation 48 (as shown in FIG. 2C). Fifth heater layer 62 is wired in series with voltage source 46 and parallel formation 48. Because CNT heater 28 is made from carbon nanotube and silicone composite, CNT heater 28 is more rigid and durable than PTC heater 30 and PTC heater 32. Therefore, in the configuration of heater system 18, CNT heater 28 should be in the outermost heater layer (e.g., third heater layer 58) so that CNT heater 28 can protected fourth heater layer 60 and fifth heater layer 62.

In the present embodiment of FIG. 3, first heater set 42 (as shown in FIG. 2C) can be located within strut assembly 12 and second heater set 44 (as shown in FIG. 2C) can be located within housing assembly 14. When first heater set 42 is located within strut assembly 12 and second heater set 44 is located within housing assembly 14, first heater set 42 and second heater set 44 can be wired in series with one another and voltage source 46. In another embodiment, first heater set 42 is located within strut assembly 12 and second heater set 44 is located within housing assembly 14, first heater set 42 and second heater set 44 each heating system can have dedicated voltage sources, and each system (first heater set 42 and second heater set 44) can be a standalone system independent of one another.

FIGS. 4A and 4B will be discussed concurrently. FIG. 4A is a graph showing resistance as a function of temperature for heater system 18. FIG. 4B is a graph showing power as a function of temperature heater system 18. The graphs in FIGS. 4A and 4B show the relationship among CNT heater 28, first PTC heater 30, and second PCT heater 32 of the first heater set 42, as discussed above. In general, because of the configuration of the PTC heater in series with the parallel formation (comprised of another PTC heater and a CNT heater) the resistance of the heater system is low when the temperature of the heater system is low. The resistance of the heater system increases as the temperature of the heater system increases. As a result of the increasing resistance, the power supplied to the overall heating system decreases as the temperature increases. Decreasing the power to the heating system prevents the heating system from overheating and conserves energy.

Discussion of Possible Embodiments

The following are non-exclusive descriptions of possible embodiments of the present invention.

In one embodiment, a hybrid heater system for an aircraft air data sensor includes a voltage source and a first hybrid heater set. The first hybrid heater set includes a carbon nanotube (CNT) heater, a first positive temperature coefficient (PTC) heater disposed in parallel with the CNT heater to form a parallel formation, and a second PTC heater disposed in series between the voltage source and the parallel formation.

The hybrid heater system of the preceding paragraph can optionally include, additionally and/or alternatively, any one or more of the following features, configurations and/or additional components:

wherein an electrical resistance of the second PTC heater is greater than an electrical resistance of the parallel formation at a temperature greater than a set temperature, and wherein the electrical resistance of the second PTC heater is less than the electrical resistance of the parallel formation at a temperature less than the set temperature;

wherein the first PTC heater and the second PTC heater have differing electrical resistivity;

wherein an effective electrical resistance of the first parallel formation is less than an electrical resistance of each of the CNT heater and the first PTC heater;

further including an air data sensor that includes a strut assembly, a housing assembly, extending from the strut assembly, a second heater set including a second CNT heater, a third PTC heater disposed in parallel with the second CNT heater to form a second parallel formation; and a fourth PTC heater disposed in series between the voltage source and the second parallel formation, wherein the first hybrid heater set is within the strut assembly, and the second hybrid heater set is within the housing assembly, and wherein the first hybrid heater set and the second hybrid heater set are electrically connected in series;

the CNT heater and the first PTC heater occupy a same layer in the air data sensor, and the same layer occupied by the CNT heater and the first PTC heater includes a first terminal, a second terminal, a first PTC heater elements extending between the first and second terminals, and CNT heater elements interleaved between the first PTC heater elements and extending between the first and second terminals;

wherein the air data probe includes an outermost probe surface, a first film adhesive and insulation layer underlying the outermost probe surface, a first heater layer underlying the first film adhesive and insulation layer, the first heater layer includes CNT heater elements of the CNT heater and first PTC heater elements of the first PTC heater, a second film adhesive and insulation layer underlying the first heater layer, a second heater layer underlying the second film adhesive and insulation layer, the second heater layer includes a second PTC heater, a third film adhesive and insulation layer underlying the second heater layer, and a sleeve surface underlying the third film adhesive and insulation layer;

wherein the CNT and the first PTC heater occupy different layers in the air data sensor; and/or wherein the air data probe includes an outermost probe surface, a first film adhesive and insulation layer underlying the outermost probe surface, a first heater layer underlying the first film adhesive and insulation layer, the first heater layer includes the CNT heater, a second film adhesive and insulation layer underlying the first heater layer, a second heater layer underlying the second adhesive and insulation layer, the second heater layer includes one of the first or second PTC heaters, a third film adhesive and insulation layer underlying the second heater layer, the third heater layer includes the other of the first or second PTC heaters, a fourth film adhesive and insulation layer underlying the third heater layer, and a sleeve surface underlying the fourth film and insulation layer.

In another embodiment, a hybrid heater system for ice protection of an air data probe on an aircraft includes a voltage source, a carbon nanotube (CNT) heater, which includes CNT heater elements, a first positive temperature coefficient (PTC) heater disposed in parallel with the CNT heater to form a parallel formation, and a second PTC heater. The first PTC heater includes first PTC heater elements interleaved with the CNT heater elements in a first air data probe layer. The second PTC heater is disposed in a second air data probe layer and in series between the voltage source and the parallel formation.

The hybrid heater system of the preceding paragraph can optionally include, additionally and/or alternatively, any one or more of the following features, configurations and/or additional components:

wherein the second PTC heater establishes the maximum temperature capability for ice protection, and the hybrid heater system operates with an absence of active temperature controls;

wherein the first PTC heater and the second PTC heater have different electrical resistivity;

wherein an effective electrical resistance of the first parallel formation is less than an electrical resistance of each of the CNT heater and the first PTC heater;

wherein the air data probe layer includes first and second terminals between which the interleaved CNT and first PTC heater elements extend; and/or wherein the second air data probe layer underlies the first air data probe layer.

In another embodiment, a method of making a heater for an air data probe includes positioning on the air data probe a first heater layer. The first heater layer includes a carbon nanotube (CNT) heater element and a first positive temperature coefficient (PTC) heater element interleaved with one another. The method of heating an air data probe further includes positioning on the air data probe a second heater layer. The second heater layer includes a second PTC heater element. The method of heating an air data probe further includes wiring the first heater layer and the second heater layer so that the CNT heater element and the first PTC heater element are in parallel with one another defining a parallel formation. The method of heating an air data probe further includes wiring the second heater layer so that the second PTC heater element is in series with the first parallel formation and a voltage source.

The method of the preceding paragraph can optionally include, additionally and/or alternatively, any one or more of the following features, configurations and/or additional components:

wherein the second PTC heater element establishes a maximum temperature capability for ice protection, and the hybrid heater system operates with an absence of active temperature controls;

wherein the first PTC heater element and the second PTC heater element have differing electrical resistivity;

wherein an effective electrical resistance of the parallel formation is less than an electrical resistance of each of the CNT heater element and the first PTC heater element; and/or wherein the first heater layer is split between two heater layers and includes a layer of film adhesive and insulation therebetween.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A hybrid heater system for an aircraft air data sensor, the hybrid heater system comprising:
   a voltage source; and
   a first hybrid heater set comprising:
      a carbon nanotube (CNT) heater;
      a first positive temperature coefficient (PTC) heater disposed in parallel with the CNT heater to form a first parallel formation; and
      a second PTC heater disposed in series between the voltage source and the first parallel formation;
      wherein an electrical resistance of the second PTC heater is greater than an electrical resistance of the first parallel formation at a temperature greater than a set temperature, and wherein the electrical resistance of the second PTC heater is less than the electrical resistance of the first parallel formation at a temperature less than the set temperature.

2. The hybrid heater system of claim 1, wherein the first PTC heater and the second PTC heater have differing electrical resistivity.

3. The heater system of claim 1, wherein an electrical resistance of the first parallel formation is less than an individual electrical resistance of each of the CNT heater and the first PTC heater.

4. An air data sensor comprising:
   a strut assembly;
   a tubular housing assembly, extending from the strut assembly; and
   a hybrid heater system comprising:
      a voltage source;
      a first hybrid heater set comprising:
         a first carbon nanotube (CNT) heater;
         a first positive temperature coefficient (PTC) heater disposed in parallel with the CNT heater to form a first parallel formation; and
         a second PTC heater disposed in series between the voltage source and the first parallel formation; and
      a second heater set comprising:
         a second CNT heater;
         a third PTC heater disposed in parallel with the second CNT heater to form a second parallel formation; and
         a fourth PTC heater disposed in series between the voltage source and the second parallel formation,
         wherein the first hybrid heater set is within the strut assembly, and the second hybrid heater set is within the housing assembly, and wherein the first hybrid heater set and the second hybrid heater set are electrically connected in series.

5. The air data sensor of claim 4, wherein:
   the first CNT heater and the first PTC heater occupy a same layer in the air data sensor, and the same layer occupied by the first CNT heater and the first PTC heater comprises:
   a first terminal;
   a second terminal;

first PTC heater elements extending between the first and second terminals; and

CNT heater elements interleaved between the first PTC heater elements and extending between the first and second terminals.

6. The air data sensor of claim 4, further comprising:
an outermost probe surface;
a first film adhesive and insulation layer underlying the outermost probe surface;
a first heater layer underlying the first film adhesive and insulation layer, the first heater layer comprising CNT heater elements of the first CNT heater and first PTC heater elements of the first PTC heater;
a second film adhesive and insulation layer underlying the first heater layer;
a second heater layer underlying the second film adhesive and insulation layer, the second heater layer comprising a second PTC heater;
a third film adhesive and insulation layer underlying the second heater layer; and
a sleeve surface underlying the third film adhesive and insulation layer.

7. The air data sensor of claim 4, wherein the first CNT heater and the first PTC heater occupy different layers in the air data sensor.

8. The air data sensor of claim 4, further comprising:
an outermost probe surface;
a first film adhesive and insulation layer underlying the outermost probe surface;
a first heater layer underlying the first film adhesive and insulation layer, the first heater layer comprising the first CNT heater;
a second film adhesive and insulation layer underlying the first heater layer;
a second heater layer underlying the second film adhesive and insulation layer, the second heater layer comprising one of the first or second PTC heaters;
a third film adhesive and insulation layer underlying the second heater layer;
a third heater layer underlying the third film adhesive and insulation layer, the third heater layer comprising the other of the first or second PTC heaters;
a fourth film adhesive and insulation layer underlying the third heater layer; and
a sleeve surface underlying the fourth film adhesive and insulation layer.

9. A hybrid heater system for ice protection of an air data probe on an aircraft, the hybrid heater system comprising:
a voltage source;
a carbon nanotube (CNT) heater comprising CNT heater elements;
a first positive temperature coefficient (PTC) heater disposed in parallel with the CNT heater to form a parallel formation, wherein the first PTC heater comprises first PTC heater elements interleaved with the CNT heater elements in a first air data probe layer; and
a second PTC heater disposed in a second air data probe layer and in series between the voltage source and the parallel formation;
wherein an electrical resistance of the second PTC heater is greater than an electrical resistance of the parallel formation at a temperature greater than a set temperature, and wherein the electrical resistance of the second PTC heater is less than the electrical resistance of the first parallel formation at a temperature less than the set temperature.

10. The hybrid heater system of claim 9, wherein the second PTC heater establishes the maximum temperature capability for ice protection, and the hybrid heater system operates with an absence of active temperature controls.

11. The hybrid heater system of claim 9, wherein the first PTC heater and the second PTC heater have differing electrical resistivity.

12. The heater system of claim 9, wherein an effective electrical resistance of the parallel formation is less than an electrical resistance of each of the CNT heater and the first PTC heater.

13. The hybrid heater system of claim 9, wherein the first air data probe layer comprises first and second terminals between which the interleaved CNT and first PTC heater elements extend.

14. The hybrid heater system according to claim 9, wherein the second air data probe layer underlies the first air data probe layer.

15. A method of making a heater for an air data probe comprising:
positioning on the air data probe a first heater layer comprising a carbon nanotube (CNT) heater element and a first positive temperature coefficient (PTC) heater element interleaved with one another;
positioning on the air data probe a second heater layer comprising a second PTC heater element;
wiring the first heater layer so that the CNT heater element and the first PTC heater element are in parallel with one another defining a parallel formation; and
wiring the second heater layer so that the second PTC heater element is in series with the parallel formation and a voltage source.

16. The method of claim 15, wherein the second PTC heater element establishes a maximum temperature capability for ice protection, and the hybrid heater system operates with an absence of active temperature controls.

17. The method of claim 15, wherein the first PTC heater element and the second PTC heater element have differing electrical resistivity.

18. The method of claim 15, wherein an effective electrical resistance of the parallel formation is less than an electrical resistance of each of the CNT heater element and the first PTC heater element.

* * * * *